United States Patent
Le Blanc

(10) Patent No.: US 10,507,495 B2
(45) Date of Patent: Dec. 17, 2019

(54) APPARATUS AND METHOD FOR CLEANING A SURFACE WITH MULTIPLE PROTRUDING STUDS

(71) Applicant: Joseph Roger Le Blanc, Georgetown (CA)

(72) Inventor: Joseph Roger Le Blanc, Georgetown (CA)

(*) Notice: Subject to any disclaimer, the term of this patent is extended or adjusted under 35 U.S.C. 154(b) by 0 days.

(21) Appl. No.: 15/126,431

(22) PCT Filed: Jun. 9, 2015

(86) PCT No.: PCT/CA2015/050528
§ 371 (c)(1),
(2) Date: Sep. 15, 2016

(87) PCT Pub. No.: WO2015/188270
PCT Pub. Date: Dec. 17, 2015

(65) Prior Publication Data
US 2017/0080463 A1    Mar. 23, 2017

Related U.S. Application Data

(60) Provisional application No. 62/009,498, filed on Jun. 9, 2014.

(51) Int. Cl.
*B24B 23/00* (2006.01)
*B08B 1/00* (2006.01)
*B60S 3/04* (2006.01)
*B25F 3/00* (2006.01)

(52) U.S. Cl.
CPC ............. *B08B 1/001* (2013.01); *B08B 1/00* (2013.01); *B08B 1/008* (2013.01); *B24B 23/005* (2013.01); *B25F 3/00* (2013.01); *B60S 3/042* (2013.01)

(58) Field of Classification Search
CPC ..... B08B 1/008; B24B 23/043; B24B 23/005; B60S 3/042; A47L 25/00
See application file for complete search history.

(56) References Cited

U.S. PATENT DOCUMENTS

| 2,620,775 A | * | 12/1952 | Champayne | B24B 23/043 15/97.1 |
| 2,635,396 A | * | 4/1953 | Johnson | B24B 23/043 173/169 |
| 3,849,941 A | | 11/1974 | Barnes | |
| 4,686,797 A | | 8/1987 | Hoffman | |

(Continued)

FOREIGN PATENT DOCUMENTS

CA    2203347    10/1997

OTHER PUBLICATIONS

Canadian Intellectual Property Office as International Searching Authority, International Search Report and Written Opinion for PCT/CA2015/050528, dated Aug. 5, 2015.

*Primary Examiner* — David Redding

(57) ABSTRACT

The disclosure is directed at a method and apparatus for cleaning a surface having multiple protruding studs. The apparatus includes a top plate portion and a bottom plate portion along with a drive assembly which assists in moving the bottom plate portion with respect to the top plate portion. The drive assembly also translates rotational forces applied by a rotary tool to linear forces which are then applied to the bottom plate portion to clean the surface.

9 Claims, 6 Drawing Sheets

(56) References Cited

U.S. PATENT DOCUMENTS

| | | | | |
|---|---|---|---|---|
| 5,123,763 A | * | 6/1992 | Simmons | A47L 25/00 |
| | | | | 15/104.04 |
| 5,595,530 A | * | 1/1997 | Heidelberger | B24B 23/043 |
| | | | | 451/164 |
| 6,802,765 B1 | * | 10/2004 | Torrez | B08B 1/04 |
| | | | | 451/344 |
| 2002/0132570 A1 | * | 9/2002 | Berg | B24B 23/005 |
| | | | | 451/344 |

* cited by examiner

APPARATUS AND METHOD FOR CLEANING A SURFACE WITH MULTIPLE PROTRUDING STUDS

CROSS-REFERENCE

This application claims the benefit of priority of U.S. Patent Application No. 62/009,498, filed Jun. 9, 2014, which is incorporated herewith in its entirety.

FIELD

The present disclosure relates generally to apparatus for cleaning a surface. More particularly, the present disclosure relates to an apparatus and method for cleaning a surface with multiple protruding studs.

BACKGROUND

In different industries, such as the automotive industry, a surface can require cleaning due to dirt, paint, corrosion or other debris buildup that has accumulated on the surface. Some surfaces, such as a wheel hub assembly, may have one or more studs protruding through the surface making it more difficult to clean the surface as there is may be interference from the studs.

In conventional approaches, the surface is cleaned by hand around the protruding studs in a manner that attempts to avoid the studs. For example, the surface is cleaned by going around each stud with a cleaning implement, such as, a rag, buffer, scraper, or the like. In general, the studs are avoided during cleaning because hitting the stud can cause damage to the stud or the cleaning implement. However, this conventional approach is generally inefficient and labor-intensive as a slow and precise cleaning motion is typically required to avoid each stud. In this manner, it is also very time consuming to clean each of the small spaces in between the studs.

Therefore, there is provided a novel apparatus and method for cleaning a surface with multiple protruding studs.

SUMMARY

It is an aspect of the present disclosure to obviate or mitigate at least one disadvantage of previous apparatus and method for cleaning a surface with multiple protruding studs.

In one aspect of the disclosure, there is provided an apparatus for cleaning a surface having multiple protruding studs comprising a top plate portion including a connection portion for receiving a power tool attachment of a rotary power tool and stud engagement portions for receiving at least one of the studs a bottom plate portion including a buffing pad and stud engagement portions for receiving at least one of the studs, the bottom plate portion adjacent the top plate portion, and a drive assembly for translating rotation movement from the rotary power tool to a linear force and applying the force to the bottom plate portion for movement of the buffing pad over the surface having multiple protruding studs.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure is directed at an apparatus and method for cleaning a surface with multiple protruding studs. Studs can also refer to other types of fasteners or components such as, but not limited to, bolts, screws, lugs, pins, posts or the like. The apparatus includes a bottom brush portion which rests against the surface in order to clean the surface when rotated by a rotary tool, such as, not limited to a drill or the like. The apparatus includes a mechanism for connection of the apparatus to the rotary tool. The apparatus further includes a set of holes (or slots) which receive the multiple protruding studs such that the holes, or slots, allow the apparatus rotated about the studs when engaged with the rotary tool.

Figure 1:
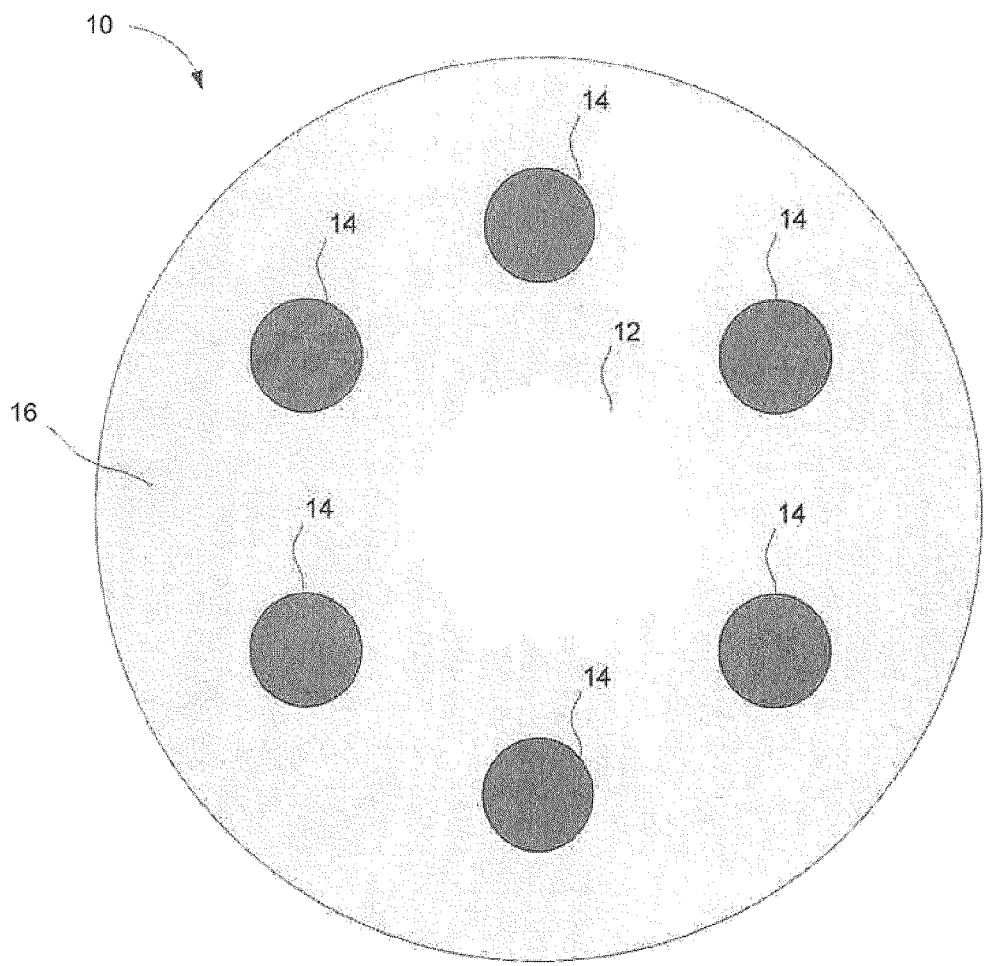
FIG. 1 is a front view of a wheel hub assembly.

In use, the surface can require cleaning due to dirt, paint, corrosion and other debris that has accumulated on the surface. One such surface is shown in FIG. 1 which is a schematic diagram of a wheel hub assembly. With a wheel hub assembly, the surface may pick up debris when the vehicle is going from one location to another. This is even more likely if the vehicle is being driven in construction sites or muddy locations.

As illustrated in FIG. 1, the wheel hub assembly 10 includes a surface 16 to be cleaned. Wheel hub assemblies 10 are used to connect a tire, a wheel or both to an axle of a vehicle. The wheel hub assembly 10 is typically annular in shape with a central opening 12 for attachment or mounting to the axle. The wheel hub assembly 10 also has multiple studs 14 located annularly around the opening 12 to assist in the attachment of the wheel hub assembly to the axle.

Figure 2:
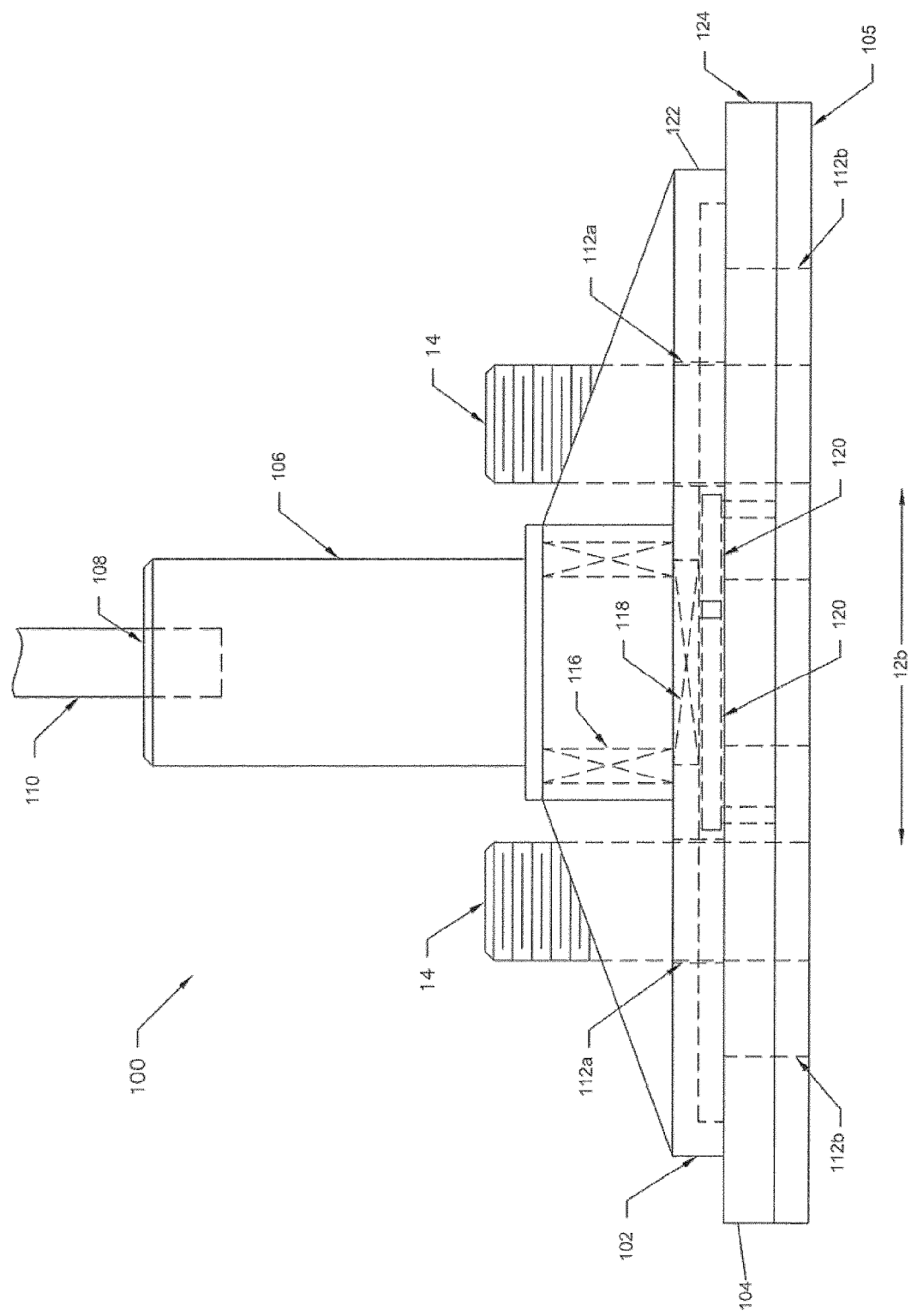
FIG. 2 is a front perspective view of an apparatus for cleaning a surface with multiple protruding studs according to an embodiment.

Turning to FIG. 2, a schematic front perspective view of an apparatus for cleaning a surface with multiple protruding studs is shown. The apparatus 100 includes a top portion, or top plate portion, 102 and a bottom, or bottom plate portion 104 abutting the top plate portion 102. The descriptors top and bottom are used to provide descriptions to the different plate portions and not meant to suggest that the apparatus is expected to always be in a vertical direction. As can be seen in FIG. 2, both the top plate portion 102 and the bottom plate portion 104 have similar footprints with the bottom plate portion 104 being slightly larger than the top plate portion 102. The top plate portion 102 may be seen as a stabilizing plate portion while the bottom plate portion 104 may be seen as a sliding plate portion. The bottom plate portion 104 is attached to a buffing pad 105 or the like which contacts the surface to be cleaned. The buffing pad 105 is attached to a surface of the bottom plate portion 104 away from the top plate portion 102 and serves to perform the cleaning when the apparatus 100 is moved by the rotary power tool.

The apparatus 100 further includes a cylindrical portion 106 which extends from the top plate portion 102, the cylindrical portion 106 including a connection portion 108 at one end of the cylindrical portion 106 configured to receive and retain an attachment from a power tool (or power tool attachment 110). The power tool may be a rotary power tool, such as, but not limited to, an air wrench, a power drill or the like or a power tool attachment. In some cases, the power tool attachment 110 may be a Y-t" driver, a W' driver, a 3.0 mm driver, or the like. In further cases, the power tool attachment 110 or the power tool, or both, can be integrally mounted to the connection portion 108. In operation, the power tool is used to control the apparatus 100 for cleaning the surface with multiple protruding studs as will be described below.

The top plate portion 102 and the bottom plate portion 104 include stud engagement portions, such as holes 112 for receiving the protruding studs 14. In the top plate portion 102, the holes 112a are circular, or may be seen as cylindrical passageways, and are sized to receive the stud 14 while, in the bottom plate portion 104, the holes 112b (see FIG. 3) are oval or elliptical in shape allowing the apparatus 10 to move "back and forth" (as illustrated by the arrow 114 of FIG. 3) along the surface to be cleaned by the buffing pad. In a preferred embodiment, the stud engagement portions 112 are spaced to be compatible with the spacing of the studs 14 protruding from the surface 16. In another embodiment, the stud engagement portions 112 may include a mechanism to temporarily retain the apparatus 100 against the surface 16; for example, a pawl mechanism that engages with the threads of a threaded stud 14 when the apparatus 100 is placed against the surface 16.

The top plate portion 102 further includes a stabilizing plate 122 which is in contact with the bottom plate portion 104. The stabilizing plate 122 can be attached or can be integrally mounted to the part of the top plate portion 102 connected to the cylindrical portion 106 and be configured, by its weight, structure, density, shape, and the like, to counteract the forces from the sliding and back-and-forth motion that are placed on the top plate portion 102 during operation of the apparatus 100. In one embodiment, the stabilizing plate 122 may include material with sufficient weight to protect the apparatus 100 from becoming unstable to hold and operate during use.

The apparatus 100 further includes a drive assembly which translates the rotational force applied by the rotary power tool to a linear force to be applied to the bottom plate portion. The drive assembly includes at least one circular bearing 116 and a cam wheel 118 which allow for the movement of the bottom plate portion 104 with respect to the top plate portion 102 when the rotary power tool is connected and operational. The cam wheel 118 is connected to the end of the cylindrical portion 106 opposite the connection portion 108 and cooperates with the cylindrical portion 106 such that the cam wheel 118 also rotates around a longitudinal axis of the cylindrical portion 106 when the apparatus is in use.

Figure 4:
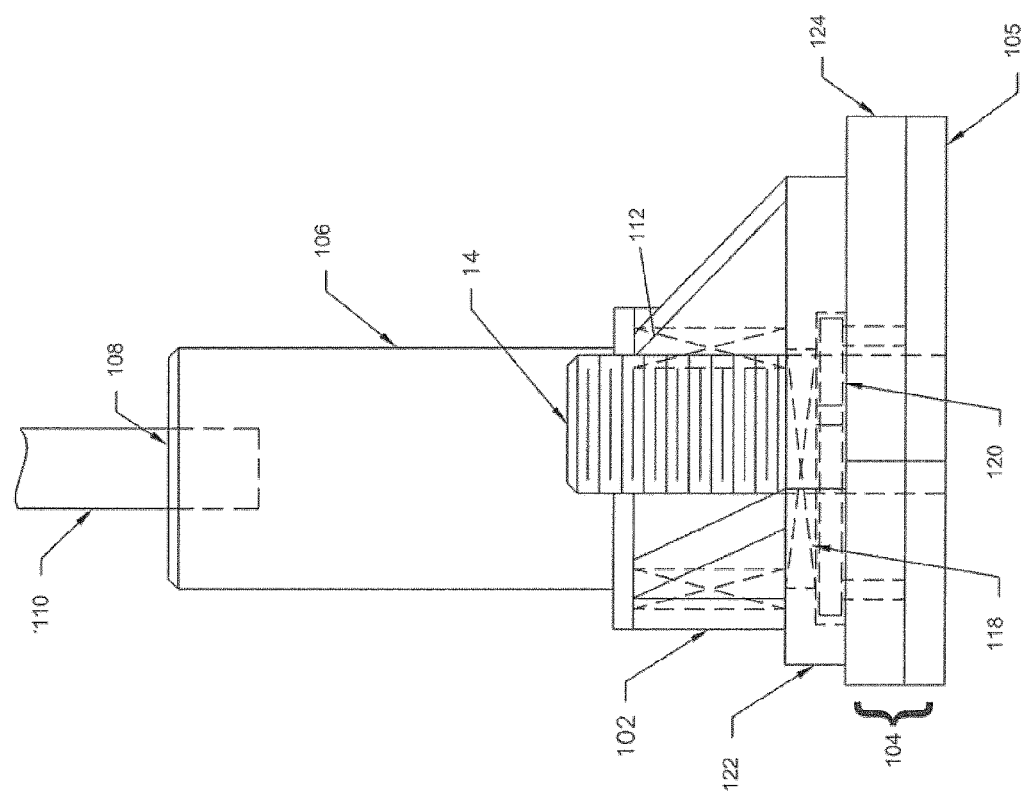
FIG. 4 is an end view of the apparatus for cleaning a surface with multiple protruding studs.

The drive assembly further includes a set of linkages 120 which assist to translate the rotational movement of the cylindrical portion 106 to a linear motion which is experienced by the bottom plate portion 104 and the buffing pad 105. The linkages 120 are rotationally connected to the cam wheel 118 such that as the cam wheel 118 rotates, the linkages 120 follow the rotational movement of the cam wheel 118. The other end of the linkages 120 are rotationally connected to a sliding plate portion 124 of the bottom plate portion 104. The rotational connections of the linkages 120 to the cam wheel 118 and the sliding plate 124 translate into constrained back-and-forth movement of the sliding plate 120 (and therefore the buffer pad 105) in a direction represented by arrow 126. In further embodiments, other mechanisms of translating rotational movement to back and forth movement can be used; for example, by using a cam shaft. FIG. 4 provides an end view of the apparatus of FIG. 2.

The length of linkages 120 control or dictate the distance that the sliding plate 124 may travel in either direction along the axis represented by arrow 126 and, in conjunction with the size of the sliding plate 124, can be configured to cover the entire surface between a pair of studs 14 and to cover at least a portion of the surface 16 around the studs 14.

As described, the sliding plate 124 receives movement from the linkages 120 to move back-and-forth along the axis defined by arrow 126. As can be seen, the buffing pad 105 is attached to the sliding plate 124 on the side opposite the linkages 120. The buffing pad 105 can be attached by any suitable means, for example, fasteners, adhesive, or the like. In some cases, the sliding plate 124 and buffing pad 105 may be one piece and form a single piece bottom plate portion 102. The buffing pad 105 is intended to be placed in contact with the surface 16 such that when the buffing pad 105 moves back-and forth along the axis defined by arrow 126, the buffing pad 105 engages the surface 16 to provide any of cleaning, scrubbing, buffing, polishing, sanding and the like. The buffing pad 105 can be placed and pressed against the surface 16 either by a user or by a suitable machine. The buffing pad 105 can be composed of any suitable cleaning material; for example, steel, foam, microfiber, wool, or the like. In another embodiment, the buffing pad 105 can include a mechanism for supplying soap, polish or other cleaning solution to the surface 16 while the buffing pad 105 is cleaning it.

In the buffer pad and sliding plate, the stud engagement portions 112b are shaped to allow the buffing pad 105 to freely move back-and-forth along the axis defined by arrow 126 without the studs 14 hitting the buffing pad 105 or vice versa. Thus, the stud engagement portions 112b are generally shaped such that they have a width that is slightly larger than the studs 14, and have a length that is slightly longer than the total back-and-forth distance travelled by the buffing pad 105. The shape of the stud engagement portions 112b will also generally follow the direction of the axis (either defined by arrow 126 of FIG. 2 or arrow 114 of FIG. 3.

Figure 3:
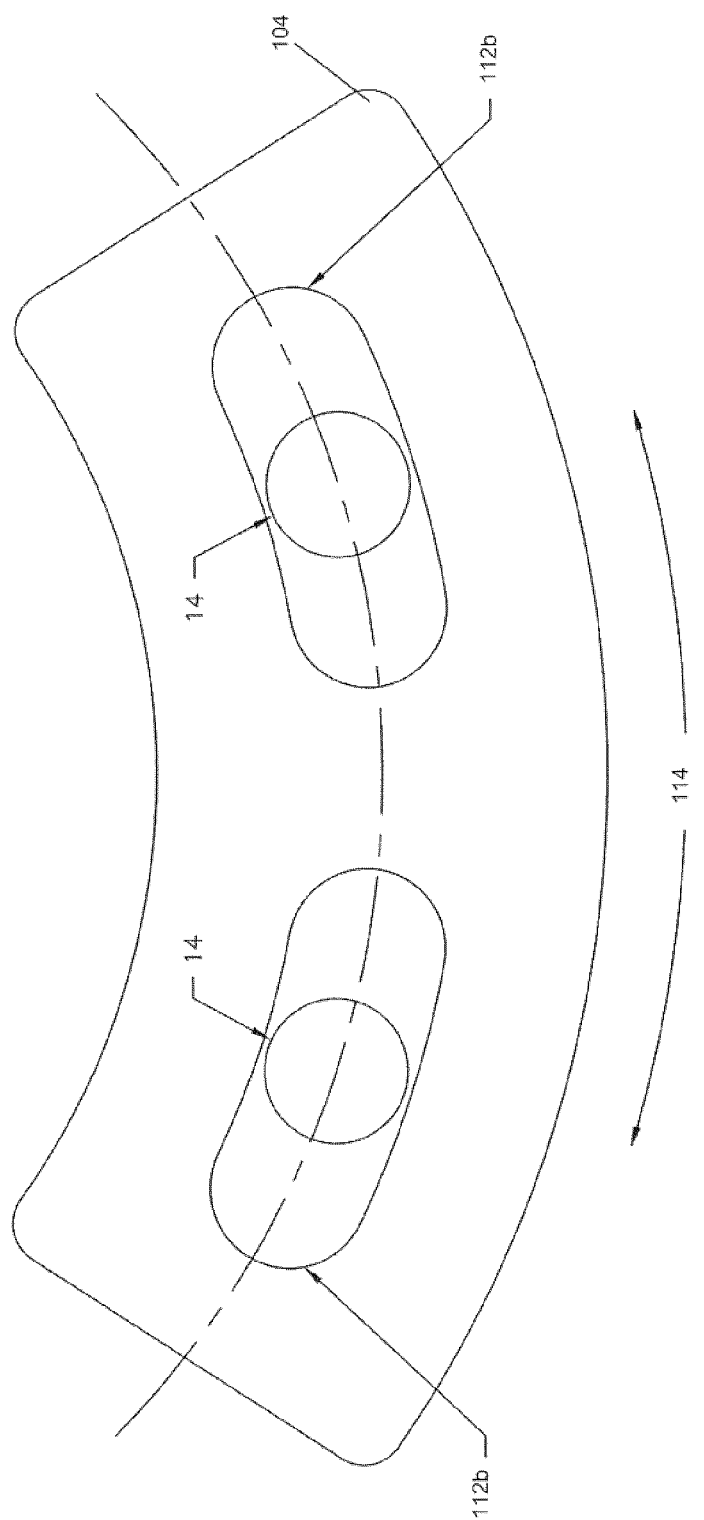
FIG. 3 is a bottom view of an apparatus for cleaning a surface with multiple protruding studs according to an embodiment.

The sliding plate 124 and the buffing pad 105 can have any shape which is suitable for cleaning the surface. In many cases, the shape of the sliding plate 124 and the buffing pad 105 will be configured to clean the total region of the surface 16 surrounding the studs 14. The shape of the sliding plate 124 and buffing pad 105 can be, for example, rectangular, circular, annular, polygonal, or the like. In the embodiment of FIG. 2, the sliding plate 124 and buffing pad 105 have a generally rectangular shape for cleaning a surface 16 that is generally rectangular and is linear between the studs 14. In the embodiment of FIG. 3, the sliding plate 124 and buffing pad 105 have a semi-annular shape to clean an annularly shaped surface 16 that is curved between the studs 14.

In some cases, the sliding plate 124 and the buffing pad 105 may have elements such as grooves and/or projections to match the contours of the surface 16 that is being cleaned. In further embodiments, the stabilizing plate 122 can also have a shape that is generally similar to the sliding plate 124 and buffing pad 105.

In the preferred embodiment, at least one bearing 116 is positioned intermediate the cylindrical portion 106 and the top plate portion 102 to constrain motion of the cylindrical portion 106 to free rotation around its longitudinal axis and reduce friction that may result due to the cylindrical portion rotating relative to the top plate portion 102.

Figure 6:
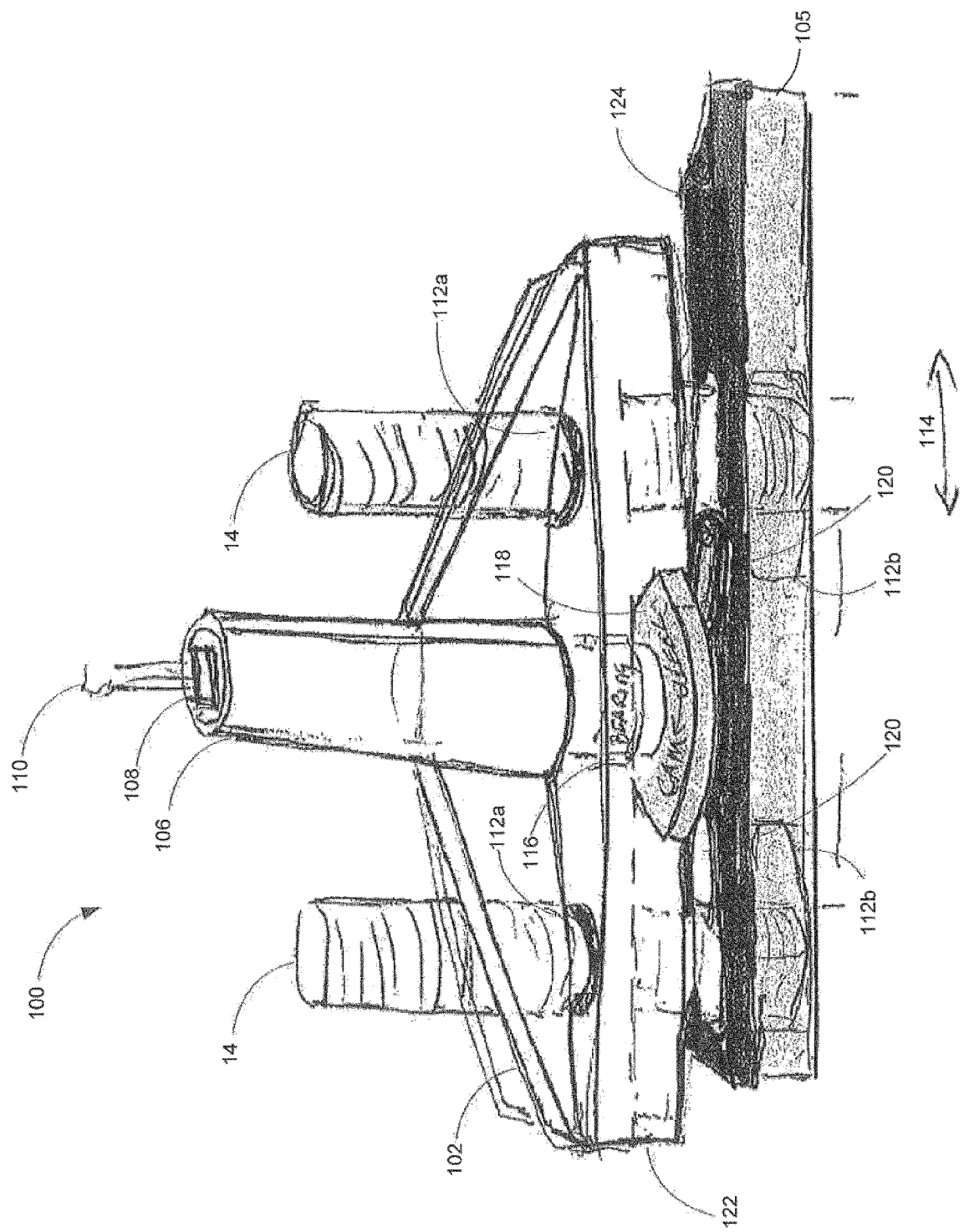
FIG. 6 is a schematic diagram of the apparatus of FIG. 2 with the bottom plate portion moved with respect to the top plate portion.

After the rotary power tool has been connected, the rotary power tool may be started to provide a rotational force to the cylindrical portion 106. The bearing 116, cam wheel 118 and linkages 120 translate this rotational force into a linear force which is then applied to the bottom plate portion 104 and the buffing pad 105 allowing the bottom plate portion 104 and the buffing pad 105 to move "back and forth" to clean the surface between the protruding studs. FIG. 6 is a schematic diagram of the apparatus in use where the bottom plate portion 104 has been moved with respect to the top plate portion 102.

During operation of the apparatus 100, the axis of back-and-forth movement of the sliding plate 124 and the buffing pad 105 will generally correspond with the shape of the sliding plate 124 and the buffing pad 105. In one embodiment, the axis of back-and-forth movement may generally follow the direction of a longitudinal length of the sliding plate 124 and the buffing pad 105. For example, in the embodiment of FIG. 2, the sliding plate 118 and the buffing pad 120 can move along a straight axis as defined by arrow 126, causing a side-to-side linear movement. In the embodiment of FIG. 3, the sliding plate 124 and the buffing pad 105 can move along a curved axis as defined by arrow 114 causing a swinging annular movement. The embodiment of FIG. 3 may thus be suited to clean the annularly shaped wheel hub assembly surface 16 illustrated in FIG. 1. The embodiment of FIG. 3 also includes the parts of FIG. 2.

After the surface between two adjacent studs 14 has been cleaned, the apparatus 10 can be moved to another pair or set of adjacent studs 10 and the process repeated.

Figure 5:
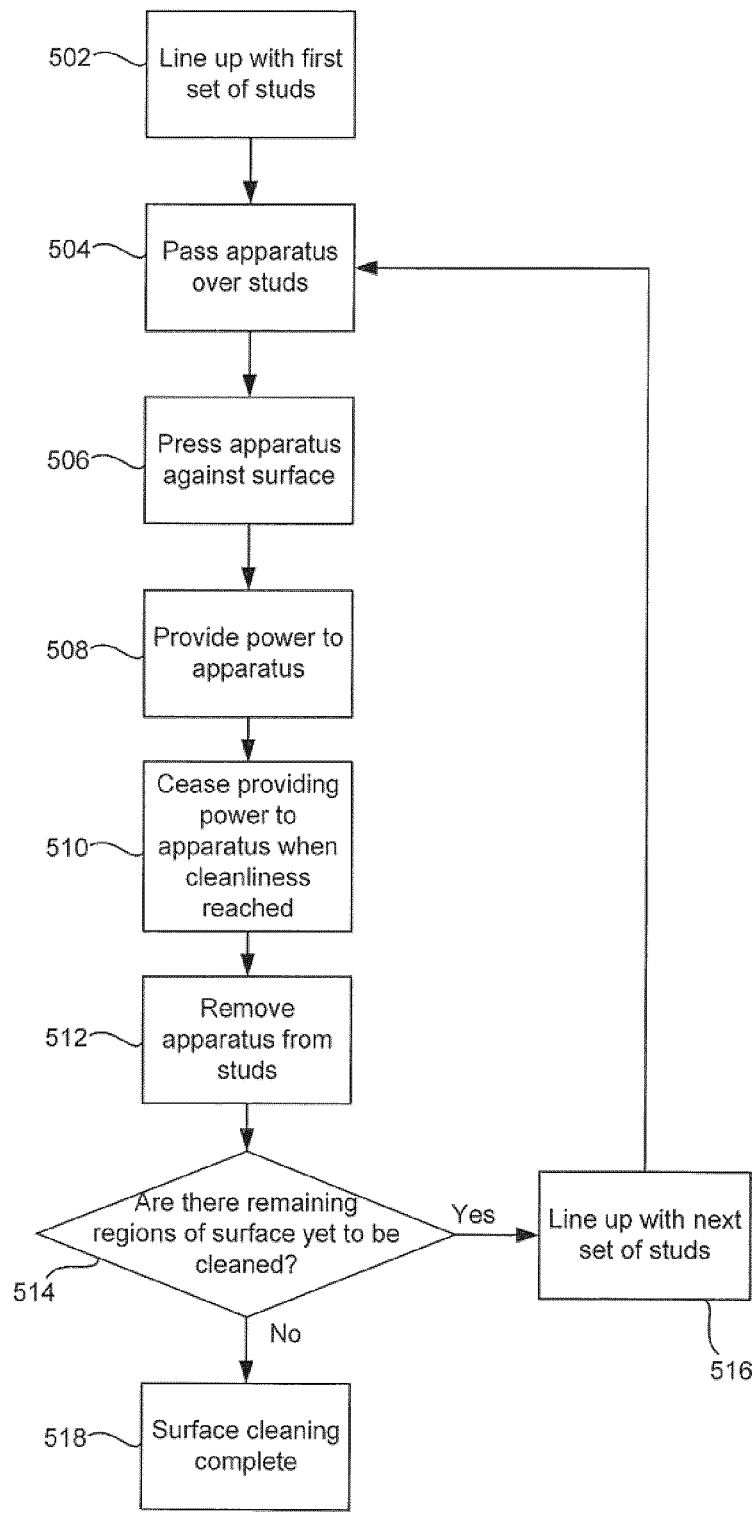
FIG. 5 is a flowchart of a method for cleaning a surface with multiple protruding studs according to an embodiment.

FIG. 5 is a flowchart of a method 500 for cleaning a surface with multiple protruding studs. At 502, the apparatus 100 is positioned such that the stud engagement portions 112 are lined up with a first set of studs 14. The set of studs 14 can include two or more studs depending on the number of stud engagement portions 112. At 504, the apparatus 100 passes over the first set of studs 14 until the buffing pad 105 abuts the surface 16. At 508, the apparatus 100 is pressed against the surface 16.

At 508, the rotary power tool provides power or torque to the apparatus 100 via a connection between the power tool attachment 110 and the connection portion 108. When the torque is provided, the drive assembly causes the sliding plate 124 and the buffing pad 105 to move back-and-forth with respect to the stabilizing plate 110 along the axis (such as defined by arrow 126 of arrow 114). While pressed against the surface 16, the back-and-forth motion of the buffing pad 105 against the surface 16 provide any of cleaning, scrubbing, buffing, polishing, sanding and the like to the surface to enable cleaning of the surface. At 510, the power tool ceases providing power or torque to the apparatus 100 when the surface reaches a desired level of cleanliness. The length of time the apparatus 100 is held against the surface 16 will depend on how long it takes for the surface to reach the desired level of cleanliness. After the power tool ceases providing power or torque, at 512, the apparatus 100 is removed from the studs 14 by passing the apparatus 100 over the studs 14 in the direction opposite the surface 16.

At 514, a determination is made as to whether there are any remaining regions of the surface 16 that have yet to be cleaned. At 518, if there are no remaining regions of the surface 16 to be cleaned, cleaning of the surface is complete.

If there is remaining surface to be cleaned, at 516, the apparatus 100 is positioned such that the stud engagement portions 112 are lined up with another set of studs 14. The another set of studs 14 can correspond to a region of the surface 16 that has yet to be cleaned. Then, at 504, the apparatus 100 is passed over yet a further set of studs 14 for cleaning of the surface as described above.

The surface can be cleaned in any suitable order hereby the surface between a set or pair of studs 14 can be cleaned multiple times if desired. Individual studs 14 can be part of multiple sets of studs 14, particularly where there are an even number of stud engagement portions 112 and an odd number of studs 14. In an example, for the wheel hub assembly 10 of FIG. 1 to be cleaned by the apparatus 100 of FIG. 4, the apparatus 100 would need to be successively lined up with three sets of studs 14, each set comprising two studs 14, to clean the total surface 16 of the wheel hub assembly 10.

The embodiments detailed herein are intended to provide certain advantages. Cleaning the surface 16 around multiple studs 14 at once can reduce time and increase efficiency compared to cleaning implements that require avoiding the studs 14 while cleaning or require cleaning around each stud 14 separately. The surface 16 can also be cleaned in less time as larger areas of the surface 16 are cleaned at the same time. As well, having multiple studs 14 pass through the housing top plate portion may help stabilize the apparatus 100. While the apparatus 100 is in operation, the additional studs 14 can provide additional reference "anchor" points for the stabilizing surface 122 to be oriented around. The additional stability may make the apparatus 100 easier to use and require less exertion from a user. The additional reference "anchor" points may also assist to place the buffing pad 105 in flat uniform contact with the surface 16 and not on an angle to the surface 16. Further, back and forth motion of the buffing pad 105 can provide both with-grain and against-grain cleaning of the surface 16.

In another embodiment, the apparatus may include a housing which rests atop the top plate portion 102. The housing can be formed of a resilient material, for example steel or thermoset plastic and is designed to withstand the forces applied to the apparatus 100 by the power tool. The housing can include ribs, supports or other structures for supporting the structural integrity of the apparatus 100.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. Apparatus for cleaning a surface having multiple protruding studs comprising:
   a top plate portion including a connection portion for receiving a power tool attachment of a rotary power tool and stud engagement portions for receiving at least one of the studs;
   a bottom plate portion including a buffing pad and stud engagement portions for receiving at least one of the studs, the bottom plate portion adjacent the top plate portion; and
   a drive assembly for translating rotation movement from the rotary power tool to a linear force and applying the force to the bottom plate portion for movement of the buffing pad over the surface having multiple protruding studs, the studs extending from a surface outside of the apparatus through the bottom plate into the stud engagement portions of the top plate.

2. The apparatus of claim 1 wherein the stud engagement portions of the bottom plate portions are elliptical in shape allowing the bottom plate portion to move with respect to the top plate portion in response to the linear force applied by the drive assembly.

3. The apparatus of claim 1 wherein the top plate portion includes a cylindrical portion, whereby the connection portion is located at one end of the cylindrical portion.

4. The apparatus of claim 3 wherein the drive assembly comprises:
   at least one bearing;
   a cam wheel; and
   a set of linkages connected to the cam wheel;
   wherein the drive assembly is mounted to an end of the cylindrical portion opposite the connection portion.

5. The apparatus of claim 1 wherein the top plate portion comprises a stabilizing plate.

6. The apparatus of claim 1 wherein the bottom plate portion comprises:
   a sliding plate; and
   a buffing pad.

7. The apparatus of claim 1 wherein the bottom plate portion is rectangular, circular, annular or polygonal.

8. The apparatus of claim 1 wherein the bottom plate portion comprises contours to match the surface.

9. The apparatus of claim 1 wherein a footprint of the top plate portion is similar to a footprint of the bottom plate portion.

* * * * *